US006940252B2

(12) United States Patent
Kobayashi et al.

(10) Patent No.: US 6,940,252 B2
(45) Date of Patent: Sep. 6, 2005

(54) DC MOTOR CONTROL METHOD AND APPARATUS

(75) Inventors: Nobutsune Kobayashi, Kanagawa (JP); Michiharu Shoji, Kanagawa (JP); Hiroyuki Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/058,409

(22) Filed: Jan. 30, 2002

(65) Prior Publication Data

US 2002/0101216 A1 Aug. 1, 2002

(30) Foreign Application Priority Data

Jan. 31, 2001 (JP) .................................... 2001-024446
Jan. 31, 2001 (JP) .................................... 2001-024447

(51) Int. Cl.[7] .............................. H02P 5/34; H02P 7/42

(52) U.S. Cl. ...................... 318/800; 318/560; 318/561; 318/592

(58) Field of Search ................................ 318/265–268, 318/271, 276, 270, 800, 254, 138, 439, 560–646, 432, 480, 469; 101/485; 400/279; 388/806; 700/260; 187/295, 316, 390

(56) References Cited

U.S. PATENT DOCUMENTS

| | | | | | |
|---|---|---|---|---|---|
| 3,644,812 | A | * | 2/1972 | Bitto et al. | 318/254 |
| 3,986,091 | A | * | 10/1976 | Quiogue et al. | 318/594 |
| 4,127,799 | A | * | 11/1978 | Nakamura et al. | 318/373 |
| 4,146,922 | A | * | 3/1979 | Brown et al. | 700/69 |
| 4,403,181 | A | * | 9/1983 | Kohzai et al. | 318/664 |
| 4,469,993 | A | * | 9/1984 | Swanson et al. | 318/561 |
| 4,488,098 | A | * | 12/1984 | Shimonou | 318/561 |
| 4,551,664 | A | * | 11/1985 | Wong et al. | 318/592 |
| 4,556,827 | A | * | 12/1985 | Erdman | 318/254 |
| 5,030,900 | A | * | 7/1991 | Kono et al. | 318/592 |
| 5,076,076 | A | * | 12/1991 | Payne | 68/12.14 |
| 5,079,489 | A | * | 1/1992 | Ishii | 318/560 |
| 5,220,259 | A | * | 6/1993 | Werner et al. | 318/432 |
| 5,732,195 | A | * | 3/1998 | Nakata et al. | 700/260 |
| 5,760,558 | A | * | 6/1998 | Popat | 318/480 |
| 6,498,698 | B1 | * | 12/2002 | Golowka et al. | 360/78.12 |

FOREIGN PATENT DOCUMENTS

| | | | | |
|---|---|---|---|---|
| JP | 2000-188894 | | 7/2000 | |
| JP | 2000188894 A | * | 7/2000 | H02P/7/06 |

* cited by examiner

*Primary Examiner*—Marlon T. Fletcher
*Assistant Examiner*—Renata McCloud
(74) *Attorney, Agent, or Firm*—Fitzpatrick, Cella, Harper & Scinto

(57) ABSTRACT

A DC motor control method and apparatus for reducing time required for deceleration without degrading positioning accuracy. In a device which drives a mechanism by using a DC motor as a power source, in deceleration of the DC motor, when the mechanism arrives at a predetermined position, a velocity command value to the motor, generated in accordance with a cubic function having a mild curve profile, is changed to a constant value, thus the velocity is discontinuously reduced.

11 Claims, 9 Drawing Sheets

DC MOTOR CONTROL METHOD AND APPARATUS

FIELD OF THE INVENTION

The present invention relates to a DC motor control method and apparatus, and more particularly, to control to reduce time required for deceleration in a case where a mechanism is driven by using a DC motor as a power source.

BACKGROUND OF THE INVENTION

At present, motors are used as power sources of various devices, and especially, a DC motor is widely used in OA devices and home electric products by virtue of its simple structure which does not require maintenance works, its reduced rotational unevenness and vibration, and its availability under high-speed and high-accuracy control.

An example of general DC motor control will be described. FIG. 6A is a block diagram showing a velocity control procedure for a general DC motor. This DC motor control is called PID (Proportional Integral and Differential) control or classical control. The procedure will be described.

First, a target velocity to be provided to a control target is given in the form of velocity command 601. FIGS. 6B and 6C show time change of 2 data generally used as the velocity command 601. In FIG. 6B, the target velocity is a constant value from the start, while in FIG. 6C, a velocity is increased at a constant rate to the target velocity.

The velocity command 601 is sent via a motor driver circuit 604 to a motor 605, and a mechanism 606 moves by rotation of the motor. When the movement starts, a velocity calculation circuit 609 calculates a current scanning velocity 607 of the mechanism 606 (e.g. carriage of a printer) from a signal from an encoder sensor 608 attached to the mechanism 606 and a timer included in the printer.

Then, a numerical value, obtained by subtracting the scanning velocity 607 from the velocity command value 601, is delivered, as a velocity error 602 less than the target velocity, to a PID calculation circuit 603, which calculates energy to be provided to the DC motor at that time by a method called PID calculation. The motor driver circuit 604 receives the energy, then changes the duty of motor application voltage as a constant voltage by e.g. pulsewidth modulation (hereinbelow PWM control) to change the pulsewidth of the application voltage. In this manner, the motor driver circuit controls the current value to control the energy to be provided to the DC motor 605, thereby performs velocity control.

In this control system, to realize highly accurate positional control, it is necessary to suppress a velocity immediately before stopping to a minimum velocity. That is, if the velocity immediately before stopping is high, as the mechanism arrives at a stopping target position then overruns by a large amount, high accuracy cannot be ensured without difficulty.

Further, to suppress the velocity immediately before stopping to a low-speed in a stable manner, it is necessary to suppress a velocity further immediately before the above velocity immediately before stopping to a low-speed. That is, generally, as a deceleration profile of the above-described velocity command, a curve which becomes mild as it approaches a stopping position is desirable. For example, Japanese Published Unexamined Patent Application No. 2000-188894 discloses a method using cubic and quintic curves.

However, in a case where the entire deceleration area is controlled with such mild deceleration, an average velocity of the entire deceleration area is reduced as a velocity immediately before stopping is suppressed, and as a result, time required for the deceleration is increased.

That is, it is difficult to suppress a velocity immediately before stopping to improve positioning accuracy and to reduce deceleration time at the same time. This is a problem to be solved upon designing of device using a DC motor.

Further, in the method using cubic and quintic curves in the above publication, if the deceleration immediately before stopping is mild, deceleration immediately after start of the deceleration is also mild. Accordingly, time required for the deceleration is increased, and time until the stopping is increased.

The curve by the above function is point symmetrical with respect to its central point, and the total of deceleration in the first half of the curve indicating the velocity command profile (immediately after start of deceleration) and that in the last half of the curve (immediately before stopping) are equal. This causes the above problem.

However, in actual motor control, as long as a condition for the control target to follow the deceleration control is satisfied, deceleration in a steeper curve, in comparison with that immediately before stopping, can be made immediately after the start of deceleration. This means that sufficient control cannot be made with the above cubic and quintic curves.

Therefore it is difficult to suppress a velocity immediately before stopping to improve positioning accuracy and to reduce deceleration time at the same time. This is a problem to be solved upon designing of device using a DC motor.

SUMMARY OF THE INVENTION

The first object of the present invention is to provide a DC motor control method for reducing time required for deceleration without degrading positioning accuracy.

The second object of the present invention is to provide a DC motor control apparatus for reducing time required for deceleration without degrading positioning accuracy.

According to a first aspect of the present invention, the first object is attained by providing a DC motor control method in a device which drives a mechanism by using a DC motor as a power source, comprising: a step of discontinuously reducing a velocity command value to said motor upon deceleration of said motor.

Further, according the first aspect of the present invention, the second object is attained by providing a DC motor control apparatus in a device which drives a mechanism by using a DC motor as a power source, comprising: first velocity command value generation means for generating a velocity command value to said motor in accordance with a first function; second velocity command value generation means for generating a velocity command value to said motor in accordance with a second function less than a minimum value of the velocity command value generated by said first velocity command value generation means; and change means for changing the velocity command value to said motor generated by said first velocity command value generation means to the velocity command value generated by said second velocity command value generation means, at predetermined timing.

That is, according to the first aspect of the present invention, in the device where the mechanism is driven by using the DC motor as a power source, when the DC motor is decelerated, the velocity command value to the motor is discontinuously reduced.

In this control, the time where the mechanism is driven at a low-speed can be reduced while the velocity immediately before stopping can be a low value, and time required for deceleration can be reduced without degrading the positioning accuracy.

Accordingly, the mechanism driven by the DC motor can be quickly and accurately moved, and the throughput of the device using the DC motor can be improved.

According to a second aspect of the present invention, the first object is attained by providing a DC motor control method in a device which drives a mechanism by using a DC motor as a power source, wherein a velocity command value to said motor is generated in accordance with a profile where a deceleration velocity in a first half of a deceleration area is higher than that in a last half of the deceleration area.

Further, according to the second aspect of the present invention, the second object is attained by providing a DC motor control apparatus in a device which drives a mechanism by using a DC motor as a power source, comprising: velocity command value generation means for generating a velocity command value to said motor in accordance with a profile where a deceleration velocity in a first half of a deceleration area is higher than that in a last half of the deceleration area.

That is, according to the second aspect of the present invention, in the device where the mechanism is driven by using the DC motor as a power source, the velocity command value to the motor is generated in accordance with the profile where the deceleration in the first half of the deceleration area is higher than that in the last half of the area.

In this control, time necessary for deceleration can be reduced while time for low-speed drive immediately before stopping is ensured. Accordingly, the time required for stopping can be reduced without degrading positioning accuracy, or the positioning accuracy can be improved without changing the time required for stopping.

Accordingly, the mechanism driven by the DC motor can be quickly and accurately moved, and the throughput of the device using the DC motor can be improved, otherwise, the positioning accuracy of the mechanism driven by the DC motor can be improved without degrading the throughput of the device using the DC motor.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, preferred embodiments of the present invention will now be described in detail in accordance with the accompanying drawings. In the following embodiments, a serial type ink-jet printer where a printhead having a removable ink tank is mounted will be described.

[First Embodiment]

Figure 1:
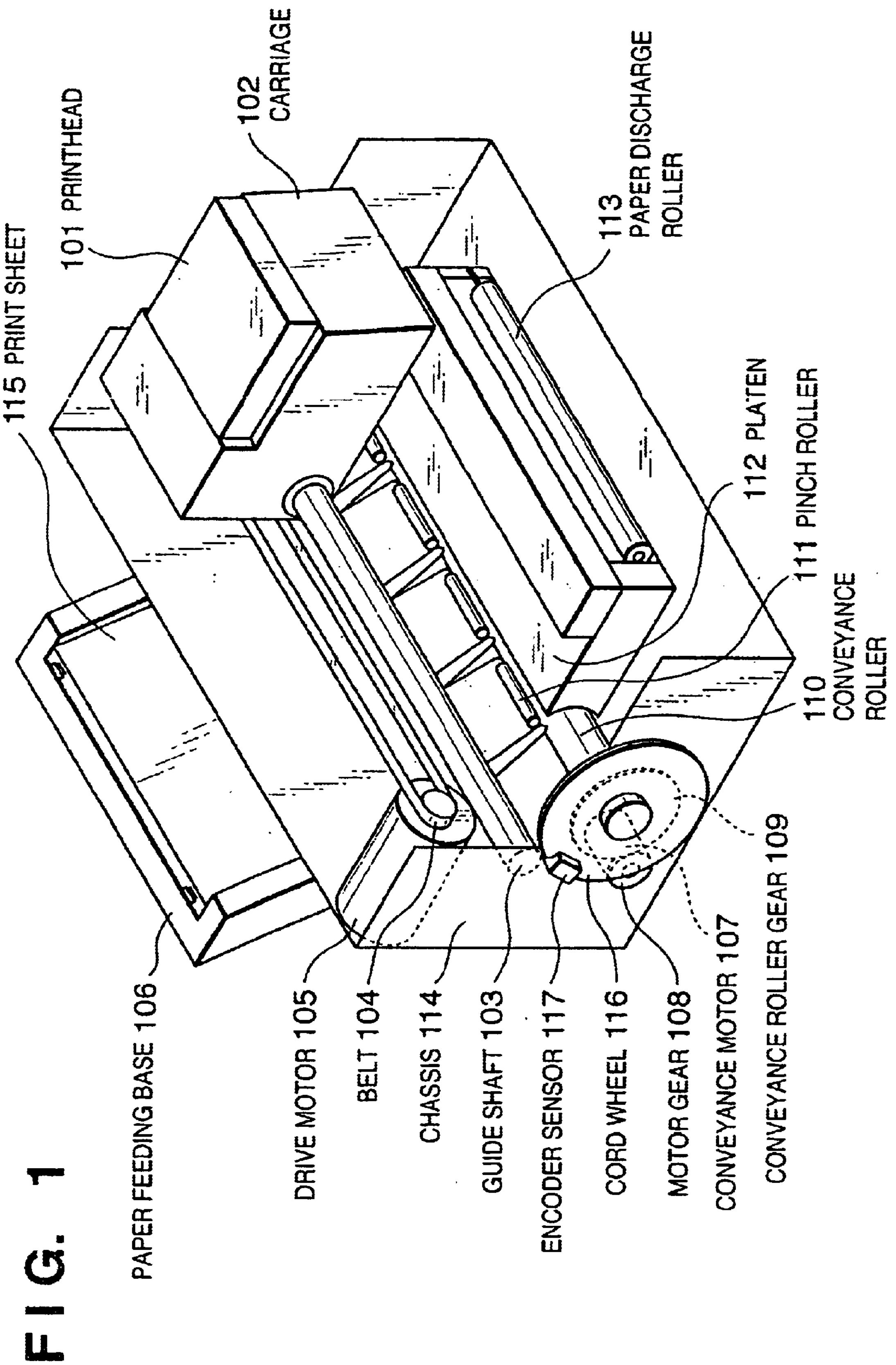
FIG. 1 is an entire perspective view schematically showing the structure of serial type ink-jet printer as a first embodiment of the present invention.

FIG. 1 is an entire perspective view showing the schematic structure of a serial type ink-jet printer according to a first embodiment. In FIG. 1, reference numeral 101 denotes a printhead having an ink tank; and 102, a carriage holding the printhead 101.

A guide shaft 103 is inserted slidably in a main scanning direction in a bearing portion of the carriage 102. The both ends of the guide shaft are fixed to a chassis 114. Power of a drive motor 105 is transmitted via a belt 104 as carriage drive transmission means, engaged with the carriage 102, and the carriage 102 moves in the main scanning direction.

During a print stand-by period, a print sheet 115 is stacked in a paper feed base 106, and upon start of printing, the print sheet is fed by a paper feed roller (not shown). To convey the fed print sheet, a conveyance roller 110 is rotated via a gear array (a motor gear 108 and a conveyance roller gear 109) as transmission means, by a driving force of paper conveyance motor 107 as a DC motor. The print sheet 115 is conveyed by an appropriate amount by pinch rollers 111, pressed against the conveyance roller 110 by a pinch roller spring (not shown) and driven-rotated, and by the conveyance roller 110.

Note that the amount of conveyance is managed by detecting and counting a slit of cord wheel (rotary encoder film 116) press-inserted in the conveyance roller 110 by an encoder sensor 117, thus the feeding amount can be controlled with high accuracy.

Figure 2:
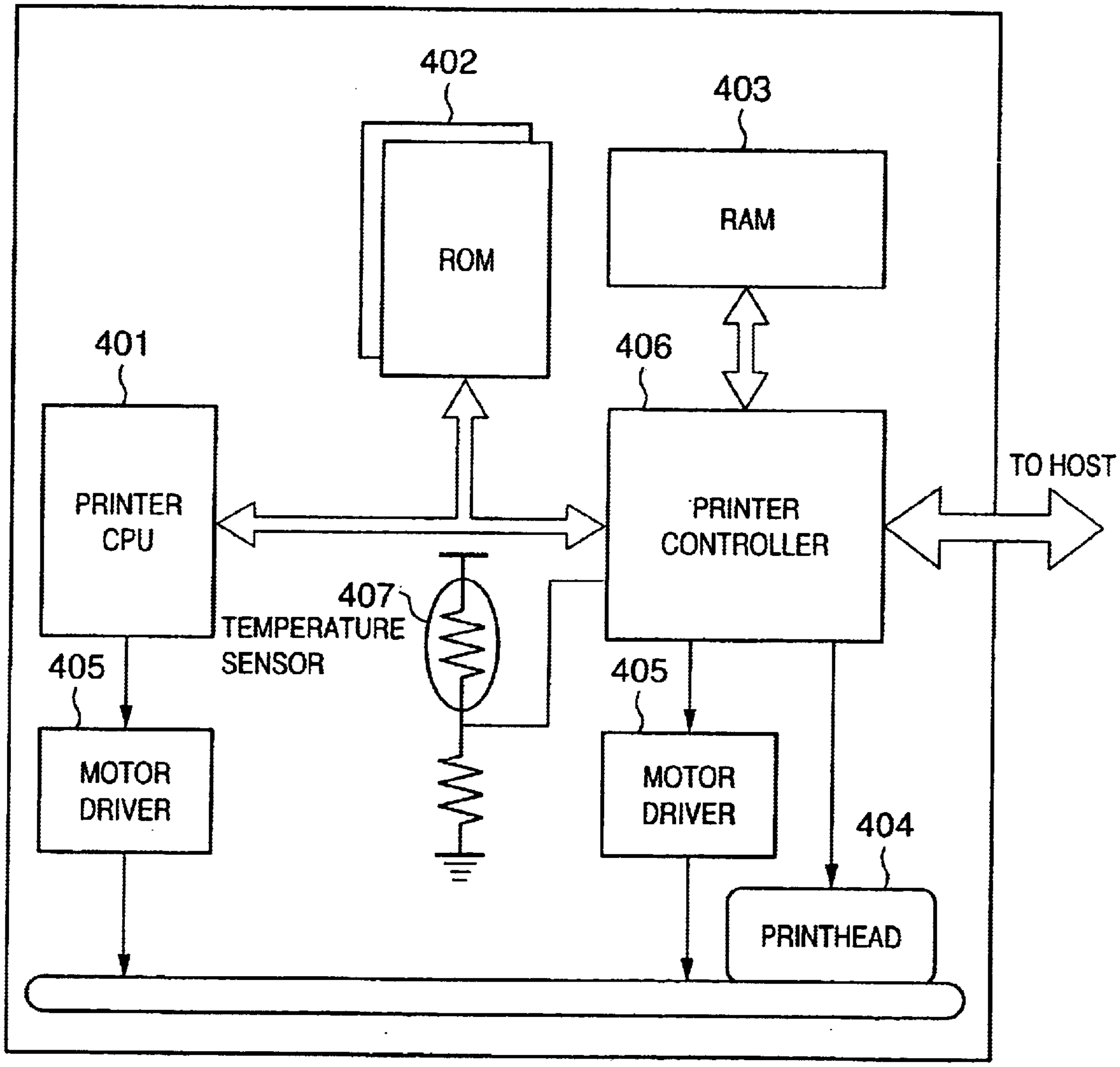
FIG. 2 is a block diagram showing a control construction of the printer in FIG. 1.

FIG. 2 is a block diagram showing a control construction of the printer in FIG. 1. In FIG. 2, numeral 401 denotes a printer control CPU of the printer which controls print processing by utilizing a printer control program, a printer emulation and print fonts stored in an ROM 402.

Numeral 403 denotes a RAM holding bitmap data for printing and data received from a host device; 404, a printhead; 405, a motor driver which drives motors for print-sheet conveyance and carriage movement; 406, a printer controller which controls access to the RAM 403, transfers/receives data to/from the host device, and transmits control signals to the motor driver; and 407, a temperature sensor comprising a thermistor or the like, which detects the temperature of the printer.

The CPU 401 performs mechanical/electrical controls on the main body by the control program in the ROM 402, reads information such as emulation command sent from the host device to the printer from an I/O data register in the printer controller 406, writes control corresponding to the command into the I/O register in the printer controller 406 and an I/O port, thus performs reading.

Figure 3:
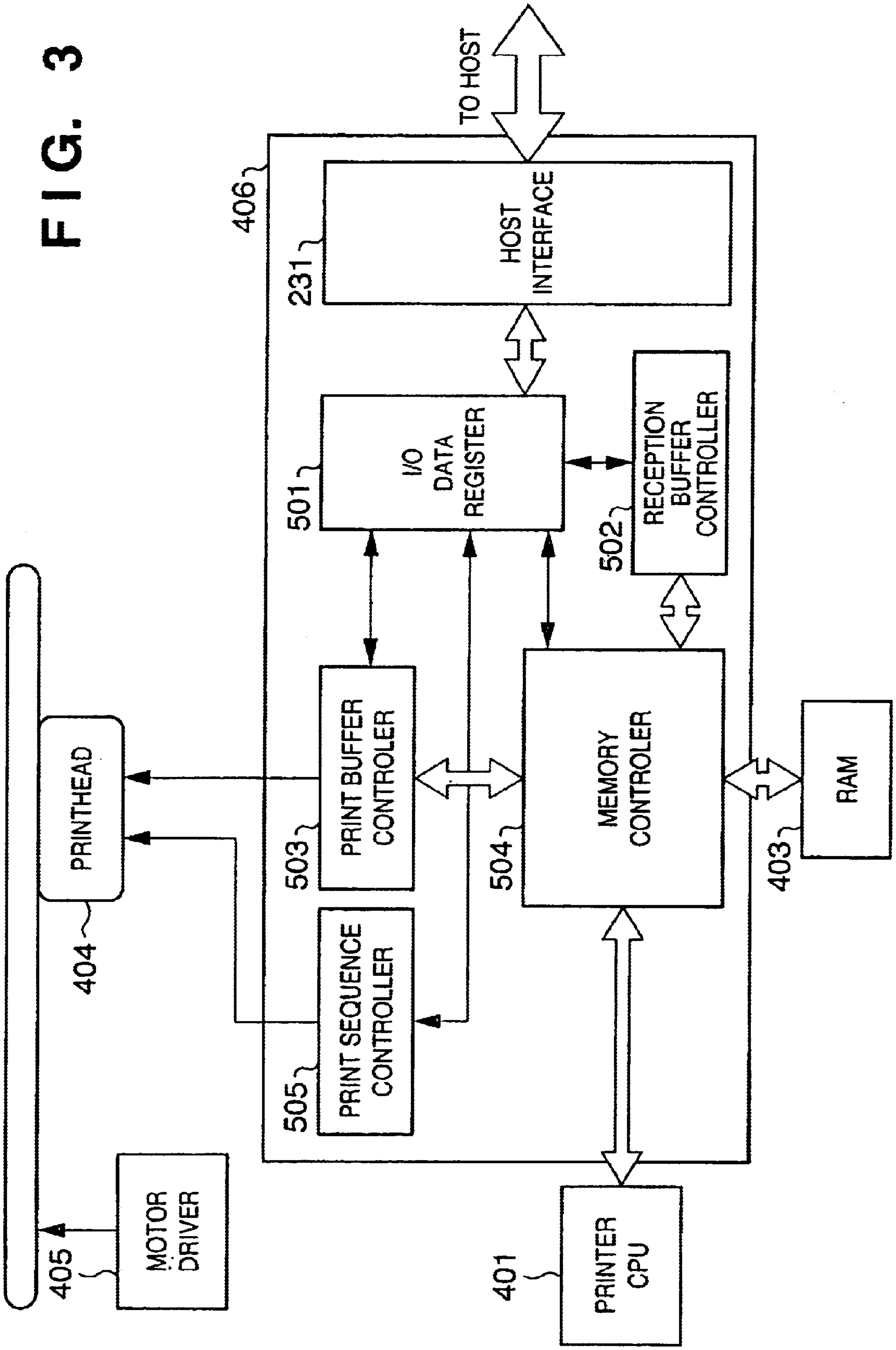
FIG. 3 is a block diagram showing the detailed construction of a printer controller in FIG. 2.

FIG. 3 is a block diagram showing the detailed construction of the printer controller 406 in FIG. 2. In FIG. 3, elements identical to those in FIG. 2 have the same reference numerals.

In FIG. 3, numeral 501 denotes an I/O register which performs command-level data transmission/reception to/from the host device; and 502, a reception buffer controller which directly writes data received from the register into the RAM 403.

Numeral 503 denotes a print buffer controller which reads print data from a print data buffer of the RAM and transmits the data to the printer head 404 upon printing; 504, a memory controller which controls three directional memory access to the RAM 403; 505, a print sequence controller which controls a print sequence; and 231, a host interface for communication with the host device.

Figure 4:
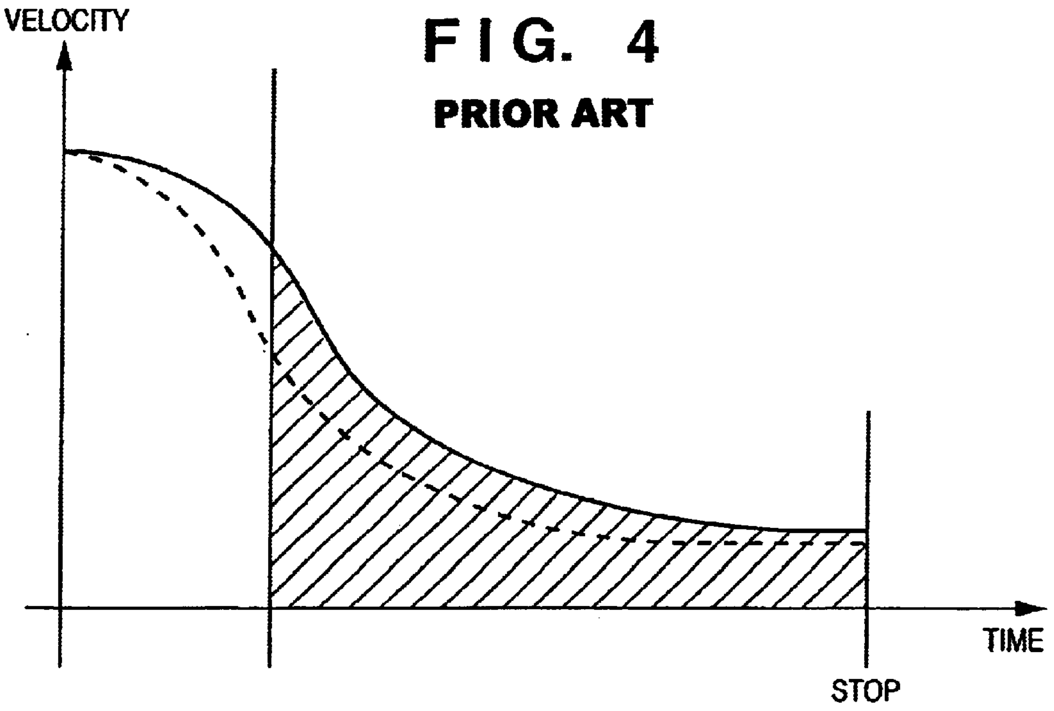
FIG. 4 PRIOR ART
FIG. 4 is a graph showing the outline of conventionally-known velocity command profile.
Figure 5:
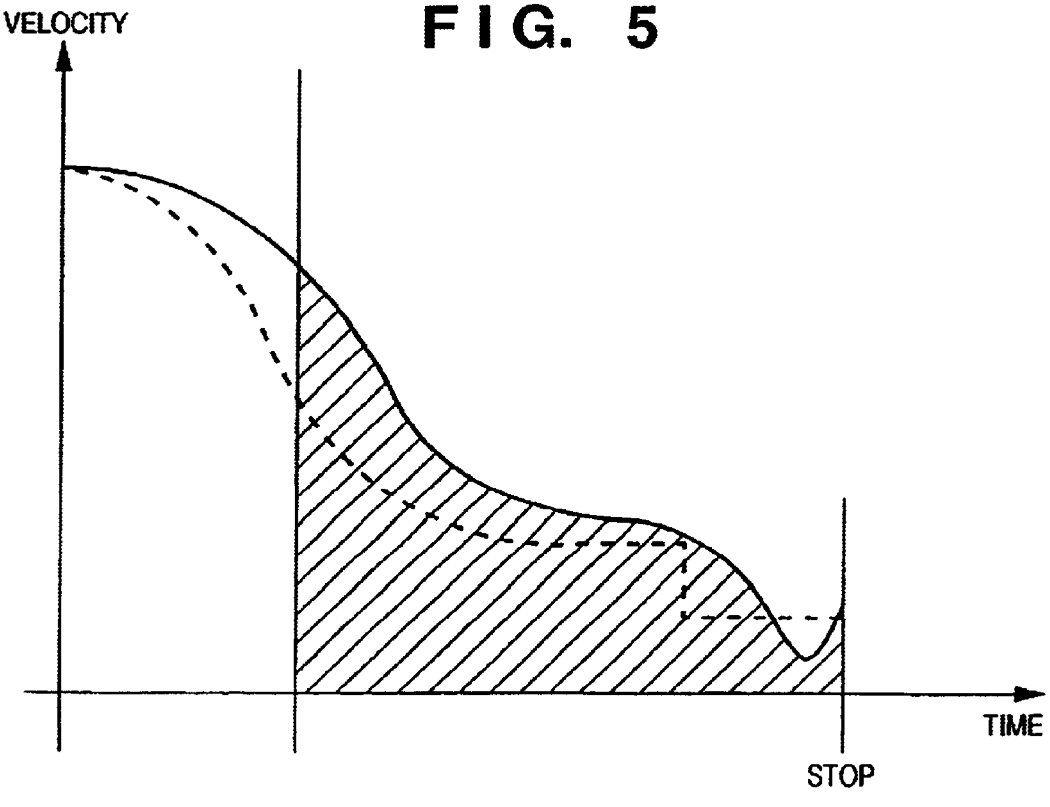
FIG. 5 is a graph showing the velocity command profile generated according to the first embodiment.

FIG. 4 is a graph showing the outline of the conventionally-known velocity command profile. FIG. 5 is a graph showing a velocity command profile generated in accordance with the present embodiment. In both figures, a dotted line indicates a velocity command curve, and a solid line, an actual physical velocity curve. A hatched portion indicates a portion necessary for positioning. As indicated by the totted line in FIG. 5, the velocity command according to the present embodiment is discontinuously changed in the middle, and the entire time until stopping is reduced.

In the velocity profile of the continuous curve as shown in FIG. 4, to reduce a velocity immediately before stopping to an ideal velocity, the last half velocity must be sufficiently low velocity. Naturally, time for low-speed drive is prolonged, and time required for positioning cannot be reduced without difficulty. In this manner, if the velocity command profile is a mild curve, although a physical velocity can be easily attained in correspondence with the profile, time until stopping is long since time for low-speed movement is long.

On the other hand, in the velocity command profile according to the present embodiment as shown in FIG. 5, only the velocity immediately before stopping is discontinuously extremely reduced. As a result, in comparison with the profile in FIG. 4, in a case where the velocity immediately before stopping has the same value, the distance of low-speed drive can be reduced.

In this case, as the command value profile is discontinuous, a mechanical design must be optimized, and a final velocity of the profile must be optimized, and further, a differentiation-preceding type profile must be employed for more appropriate following of changes of command value in the PID control, for attaining a physical velocity following the discontinuous command. However, these countermeasures can be realized by well-known techniques and they are not substantial matters of the present embodiment, therefore, the explanations of these countermeasures will be omitted.

Figure 7:
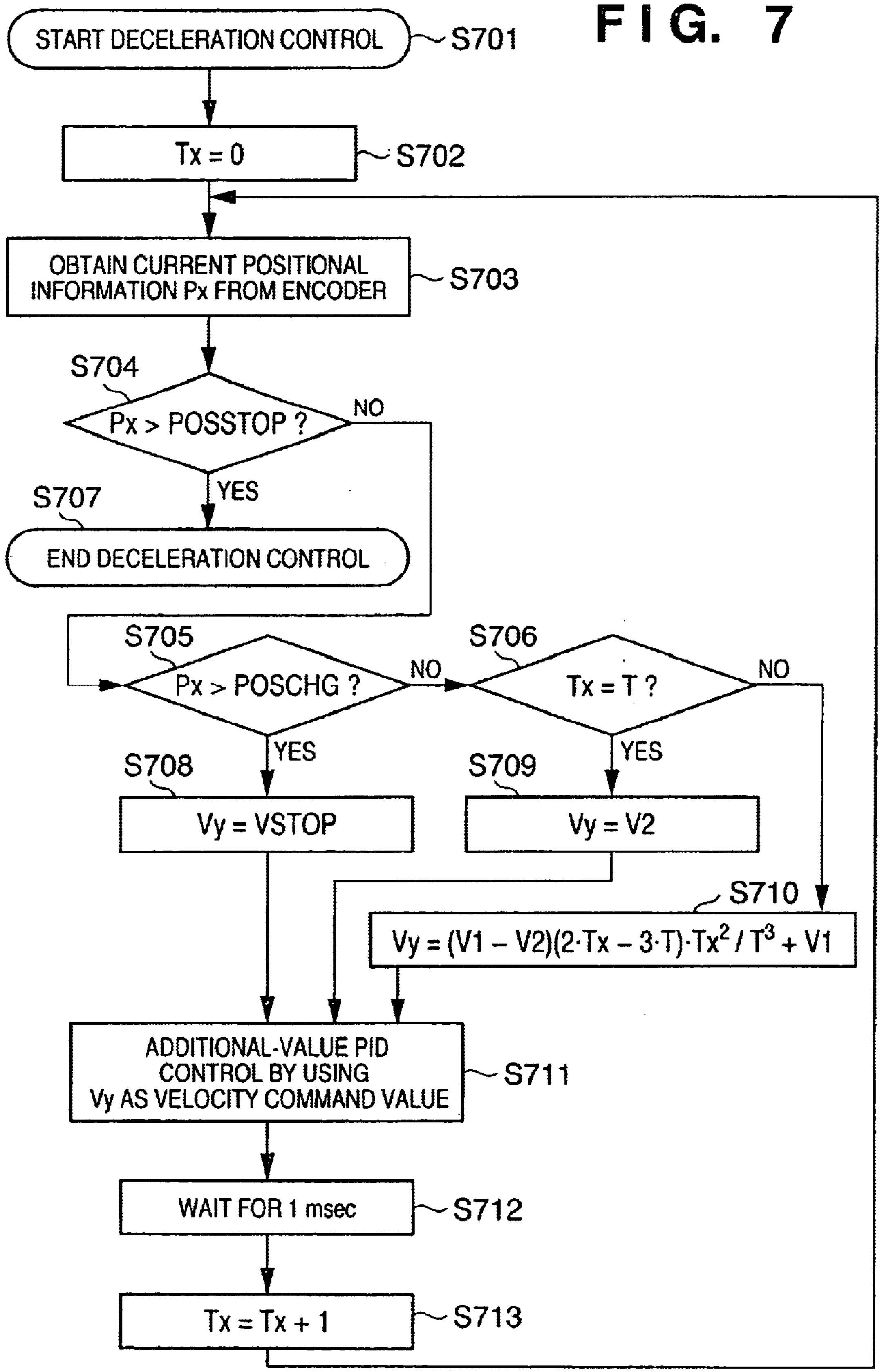
FIG. 7 is a flowchart showing deceleration control according to the first embodiment.
Figure 8:
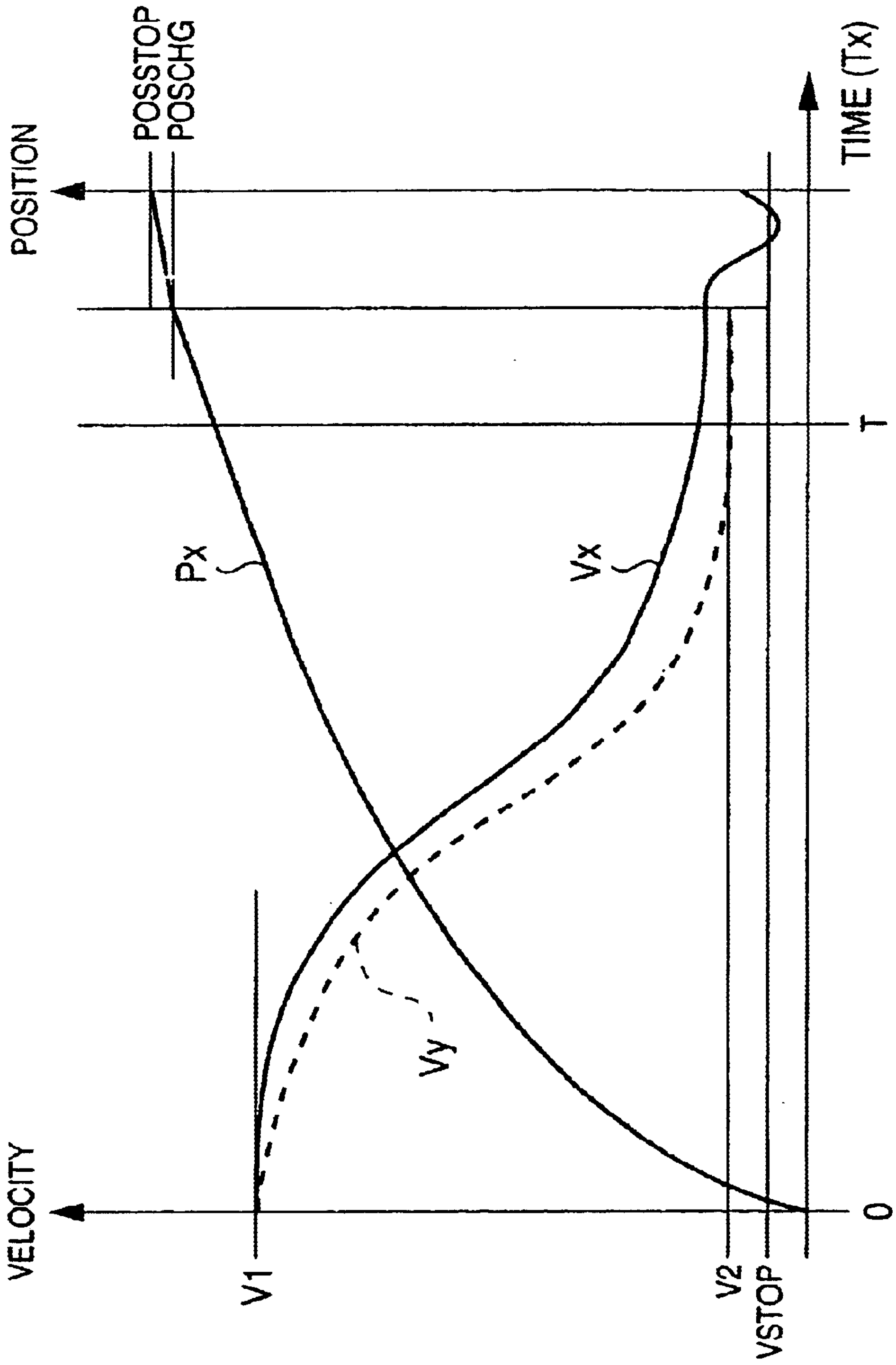
FIG. 8 is a graph showing relation among time, velocity and current position by the control in FIG. 7.

Hereinbelow, a velocity command profile generation procedure according to the present embodiment will be described in detail with reference to the flowchart of FIG. 7 and the graph of FIG. 8 showing the relation among time, velocity and current position, with control on the conveyance motor 107 as an example.

Note that in the following description,

Tx: time elapsed from start of deceleration

T: final effective time of first command value generation means

V1: initial velocity of first command value generation means

V2: final velocity of first command value generation means

VSTOP: final command velocity

POSSTOP: stopping position

POSCHG: change position of command value generation means

Vx: actual velocity of control target

Vy: velocity command value

Px: current position of control target

In the present embodiment, to generate the velocity command value, first and second command value generation means are used. The first command value generation means generates a value along a curve profile in accordance with a cubic function expressed as:

$$Vy=(V1-V2)(2\cdot Tx-3\cdot T)\cdot Tx^2/T^3+V1$$

Further, the second command value generation means outputs the constant VSTOP as the final command velocity.

First, when the deceleration control is started at step S701, the process proceeds to step S702, at which the elapsed time Tx is initialized. Note that in the present embodiment, a control period is 1 msec.

At step S703, the current positional information Px is obtained from the encoder, and at step S704, the value Px is compared with the value POSSTOP so as to check that the current position is not the stopping position. If the condition is satisfied, as the control target has already arrived at the stopping position, the process proceeds to step S707, at which the deceleration control ends.

If it is determined at step S704 that the condition is not satisfied, the process proceeds to step S705, at which the value Px is compared with the value POSCHG so as to check that the current position is not the change position of the command value generation means. If the condition is satisfied, as the condition for changing the command value generation means is satisfied, the process proceeds to step S708, at which the value VSTOP outputted from the second command value generation means is employed as the velocity command value Vy. Then the process proceeds to step S711.

If it is determined at step S705 that the condition is not satisfied, the process proceeds to step S706, which corresponds to the second determination step, at which the elapsed time Tx is compared with the final time T to enable the first command value generation means. If the condition is satisfied, as the control timing has entered a time area to end calculation of velocity command value by cubic function, the process proceeds to step S709, which corresponds to the third velocity command value generation step or means, at which the final velocity V2 of the first command value generation means is employed as the velocity command value Vy. Then the process proceeds to step S711.

If it is determined at step S706 that the condition is not satisfied, the process proceeds to step S710, at which calculation by cubic function is performed and the result is employed as the velocity command value Vy. Then the process proceeds to step S711.

At step S711, additional-value PID control using the velocity command value Vy is performed, and motor control is performed. Then at step S712, elapse of control period 1 msec is waited, and at step S713, the time information is updated. Then the process returns to step S703.

In the graph of FIG. 8, the condition at step S705 (Px>POSCHG) occurs after the condition at step S706 (Tx>T), however, the condition at step S705 may occur before the condition at step S706, in accordance with following of the velocity command value determined by inertial moment value or the like of control target and/or settings of velocity and position. Also in such case, the velocity command value is forcibly VSTOP before the cubic function becomes the final velocity V2, and as long as the inclination of the cubic function is sufficiently mild, the operation can be performed without any problem and the advantages of the present invention is not impaired.

In the above embodiment, the first velocity command value generation means generates the velocity command value in accordance with the cubic function, and the second velocity command value generation means outputs the constant, however, it may be arranged such that the first and second velocity command value generation means generate and output the velocity command value in accordance with another function. In such case, it is desirable that the velocity command value outputted from the second velocity command value generation means is approximately constant and close to the final velocity command value.

Further, in the above embodiment, the velocity command value generation means (generation method or generation function) is changed once, however, velocity command value generation means may be changed plural times. In such case, it is arranged such that the profile of velocity command value is discontinuously reduced before and after each changing.

[Second Embodiment]

Hereinbelow, a second embodiment of the present invention will be described. In the second embodiment, a serial type ink-jet printer similar to that of the first embodiment is employed. In the following description, the explanations of elements similar to those of the first embodiment will be omitted, and the characteristic feature of the second embodiment will be mainly explained.

The deceleration profile according to the present embodiment will be described with the control on the conveyance motor 107 as an example.

Figure 6A:
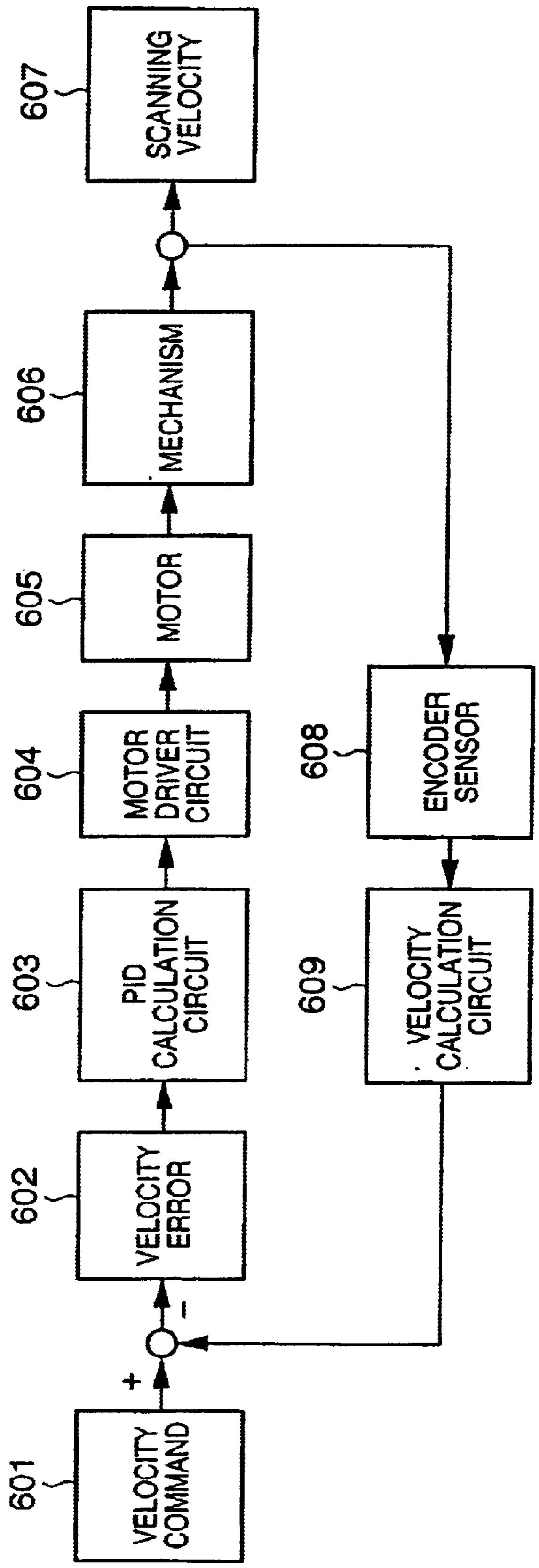
FIG. 6A PRIOR ART
FIG. 6A is a block diagram showing a general DC-motor velocity control procedure.
Figure 6B:
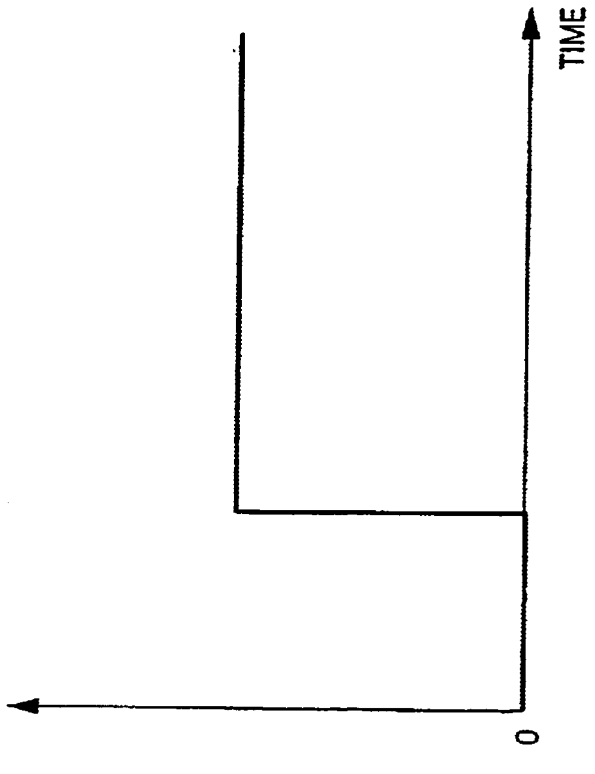
FIG. 6B PRIOR ART
FIGS. 6B and 6C are graphs showing generally-used two formats of velocity commands.
Figure 6C:
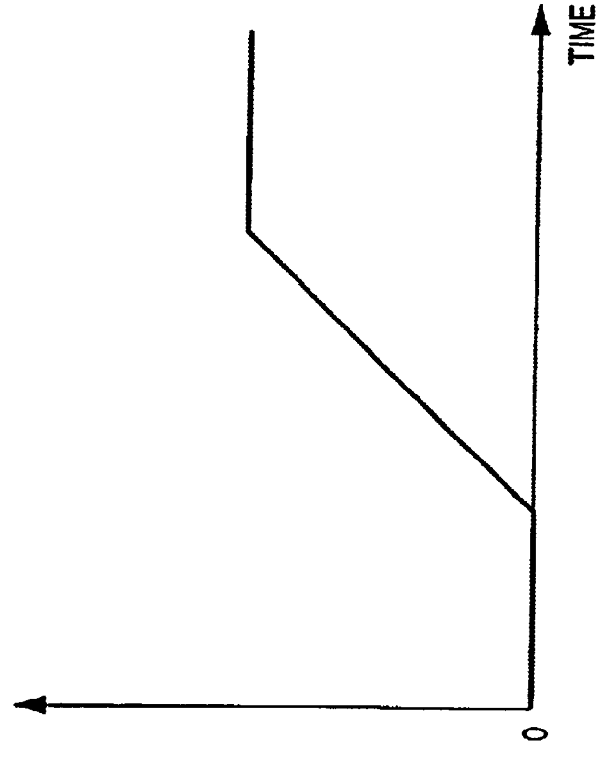
FIG. 6C PRIOR ART
Figure 9:
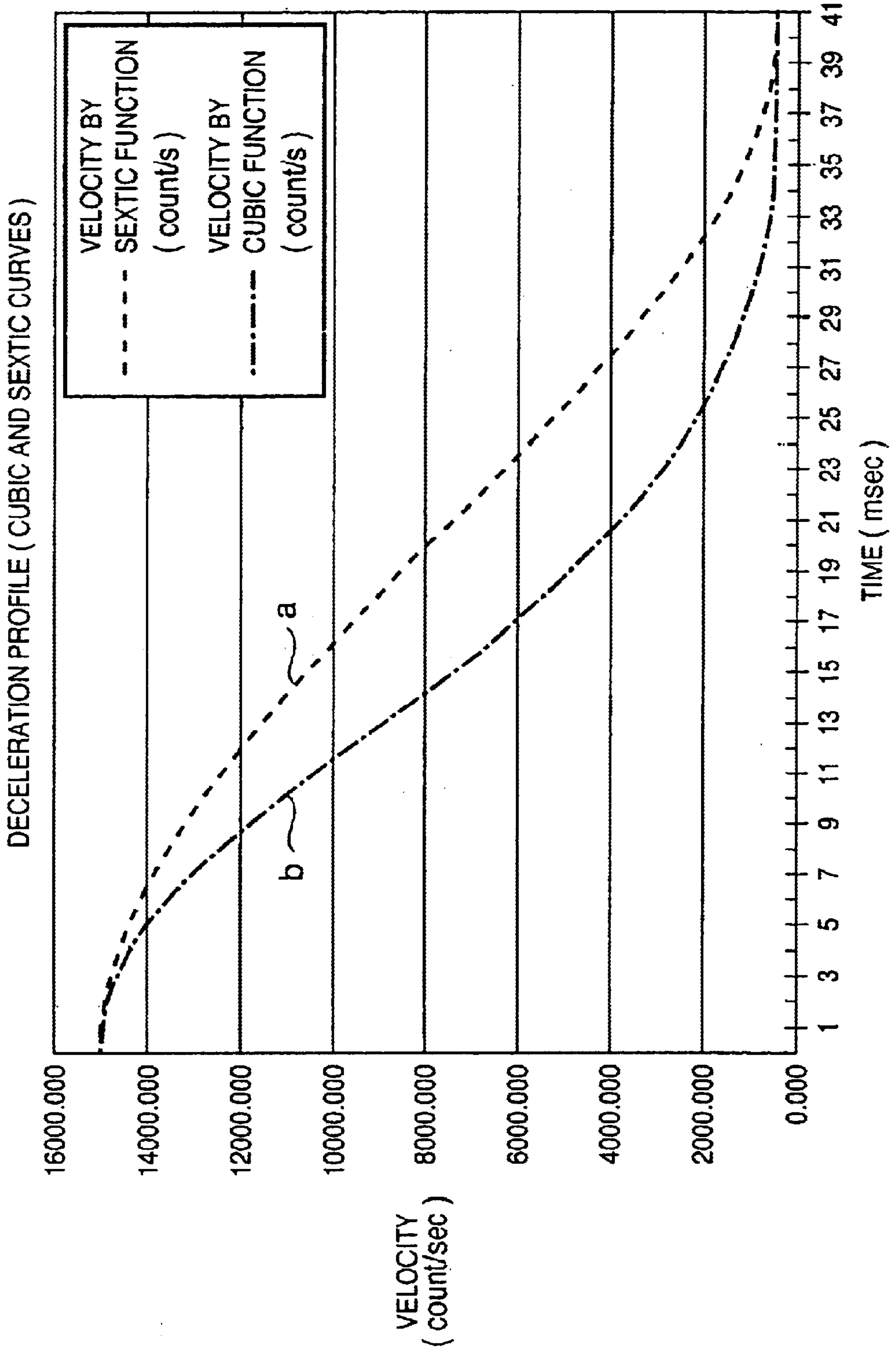
FIG. 9 is a graph showing the velocity command profile generated in accordance with a second embodiment and the conventionally-known velocity command profile.

In the present embodiment, the construction for velocity control is approximately the same as the general construction described with reference to FIG. 6A except the construction to generate the velocity command 601. FIG. 9 shows comparison between a curve profile b of velocity command value according to a sextic function according to the present embodiment and a curve profile a of velocity command value according to the conventionally-proposed cubic function.

In the present embodiment, the velocity command value having the profile b is calculated by the following expression:

$$Vy=(V1-V2)(2\cdot Tx^3-3\cdot T\cdot Tx^2+T^3)^2/T^6+V2$$

V1: initial velocity

V2: final velocity

T: time required for deceleration

Tx: time elapsed from start of deceleration

Vy: velocity command value at time Tx

As shown in FIG. 9, in a case where the same deceleration velocity is attained within the same period from the start to end of deceleration, in the deceleration profile b by sextic function, the deceleration velocity after the start of deceleration is higher and the deceleration immediately before stopping is lower in comparison with the deceleration profile a by cubic function.

In consideration of actual motor control that more abrupt deceleration can be made immediately after start of deceleration, in comparison with deceleration immediately before stopping, as long as the condition for the control target to follow the deceleration is satisfied, it can be considered that the profile by sextic function is appropriate to deceleration at a higher velocity than that in deceleration by cubic function.

Further, in the profile by sextic function, as the time for low-speed drive immediately before stopping can be longer in comparison with the profile by cubic function, the deceleration time can be reduced without degrading stopping accuracy, and the stopping accuracy can be improved in the same deceleration time.

More particularly, in a case where the above-described deceleration profile by sextic function is applied to the print sheet conveyance motor of the above-described ink-jet printer, the deceleration time can be reduced without degrading the accuracy of stopping position.

Note that in the present embodiment, the deceleration profile is obtained by a sextic function, however, any profile obtained by other function than the above-described sextic function may be employed as long as the deceleration velocity immediately after start of deceleration is higher and time for low-speed drive immediately before stopping is longer in comparison with those of the deceleration profile by cubic function.

[Other Embodiments]

In the above embodiments, the present invention is applied to the print sheet conveyance motor of the serial type ink-jet printer, however, this does not pose any limitation on the present invention. The present invention is applicable to various devices using a DC motor.

Further, the object of the present invention can be also achieved by providing a storage medium storing program code for performing the aforesaid processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, a CD-ROM, a CD-R, a magnetic tape, a non-volatile type memory card, and ROM can be used for providing the program code.

The present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or function expansion unit performs a part or entire process in accordance with designations of the program code and realizes functions of the above embodiments.

In the case where the present invention is provided in the form of the above storage medium, the storage medium stores program code corresponding to the above-mentioned flowchart (shown in FIG. 7).

As many apparently widely different embodiments of the present invention can be made without departing from the spirit and scope thereof, it is to be understood that the invention is not limited to the specific embodiments thereof except as defined in the appended claims.

What is claimed is:

1. A DC motor control method in a device which drives a mechanism by using a DC motor as a power source, comprising:

a first velocity command value generation step for generating a velocity command value to said motor in accordance with a first function based on an elapsed time after a start of deceleration;

a first determination step for determining whether said mechanism arrives at a predetermined position within a deceleration region;

a second velocity command value generation step for generating a velocity command value to said motor in accordance with a second function having an initial value less than a minimum value of the velocity command value generated in said first velocity command value generation step, upon the determination that said mechanism arrives at the predetermined position in said first determination step;

a second determination step for determining whether the elapsed time has exceeded a predetermined time, when said mechanism does not arrive at the predetermined position; and a third velocity command value generation step for outputting a constant velocity command value to said DC motor, when it is determined in said second determination step that the elapsed time has exceeded the predetermined time.

2. The DC motor control method according to claim 1, wherein said device is a printing apparatus and said mechanism is a conveyance mechanism for printing medium.

3. The DC motor control apparatus according to claim 1, wherein the minimum value of the velocity command generated by said first velocity command value generation step and the initial value of the second function are discontinuous.

4. A program product for realizing a DC motor control method in a device which drives a mechanism by using a DC motor as a power source, including program code for realizing:

a first velocity command value generation step for generating a velocity command value to said motor in accordance with a first function based on an elapsed time after a start of deceleration;

a first determination step for determining whether said mechanism arrives at a predetermined position within a deceleration region;

a second velocity command value generation step for generating a velocity command value to said motor in accordance with a second function having an initial value less than a minimum value of the velocity command value generated in said first velocity command value generation step, upon the determination that said mechanism arrives at the predetermined position in said first determination step;

a second determination step for determining whether the elapsed time has exceeded a predetermined time, when said mechanism does not arrive at the predetermined position; and a third velocity command value generation step for outputting a constant velocity command value to said DC motor, when it is determined in said second determination step that the elapsed time has exceeded the predetermined time.

5. A storage medium storing a program for realizing a DC motor control method in a device which drives a mechanism by using a DC motor as a power source, storing program codes for realizing:

a first velocity command value generation step for generating a velocity command value to said motor in accordance with a first function based on an elapsed time after a start of deceleration;

a first determination step for determining whether said mechanism arrives at a predetermined position within a deceleration region;

a second velocity command value generation step for generating a velocity command value to said motor in accordance with a second function having an initial value less than a minimum value of the velocity command value generated in said first velocity command value generation step, upon the determination that said mechanism arrives at the predetermined position in said first determination step;

a second determination step for determining whether the elapsed time has exceeded a predetermined time, when said mechanism does not arrive at the predetermined position; and a third velocity command value generation step for outputting a constant velocity command value to said DC motor, when it is determined in said second determination step that the elapsed time has exceeded the predetermined time.

6. A DC motor control apparatus in a device which drives a mechanism by using a DC motor as a power source, comprising:

first velocity command value generation means for generating a velocity command value to said motor in accordance with a first function based on an elapsed time after a start of deceleration;

second velocity command value generation means for generating a velocity command value to said motor in accordance with a second function having an initial value less than a minimum value of the velocity command value generated by said first velocity command value generation means;

change means for changing the velocity command value of said motor generated by said first velocity command value generation means to the velocity command value generated by said second velocity command value generation means, when said mechanism arrives at a predetermined position within a deceleration region; and third velocity command value generation means for outputting a constant velocity command value to said DC motor, when the elapsed time has exceeded a predetermined time and said mechanism does not arrive at the predetermined position.

7. The DC motor control apparatus according to claim 6, wherein said first function represents a curve profile, and said second function outputs a constant value.

8. The DC motor control apparatus according to claim 7, wherein said first function is a cubic function.

9. The DC motor control apparatus according to claim 6, wherein said change means performs the changing a plurality of times so as to decrease the velocity command value.

10. The DC motor control apparatus according to claim 6, wherein said device is a printing apparatus and said mechanism is a conveyance mechanism for a printing medium.

11. The DC motor control apparatus according to claim 6, wherein the minimum value of the velocity command generated by said first velocity command value generation means and the initial value of the second function are discontinuous.

* * * * *

UNITED STATES PATENT AND TRADEMARK OFFICE

CERTIFICATE OF CORRECTION

PATENT NO. : 6,940,252 B2
APPLICATION NO. : 10/058409
DATED : September 6, 2005
INVENTOR(S) : Nobutsune Kobayashi et al.

It is certified that error appears in the above-identified patent and that said Letters Patent is hereby corrected as shown below:

<u>COVER PAGE AT ITEM [56] RC</u>:
Foreign Patent Documents, “2000188894 A” should read --2000-188894 A--.

<u>COLUMN 1</u>:
Line 15, “works,” should read --work,--.
Line 47, “forms” should read --forming--.

<u>COLUMN 3</u>:
Line 41, “name” should be deleted.

<u>COLUMN 4</u>:
Line 17, “the both” should read --both--.
Line 31, “driven-rotated, and by” should read --driven by the rotation of--.
Line 46, “performs” should read --performing--.

<u>COLUMN 5</u>:
Line 12, “totted” should read --dotted--.

<u>COLUMN 6</u>:
Line 59, “is” should read --are--.

Signed and Sealed this

Eighteenth Day of December, 2007

JON W. DUDAS
*Director of the United States Patent and Trademark Office*